United States Patent Office 3,068,148
Patented Dec. 11, 1962

3,068,148
CIS-CINNAMIC ACID ANTI-INFLAMMATORY COMPOSITIONS AND PROCESS OF TREATING INFLAMMATION AND CAPILLARY FRAGILITY
Louis Freedman, Bronxville, A. Jay Merritt, New Rochelle, and Edward Eigen, Long Island City, N.Y., assignors to U.S. Vitamin & Pharmaceutical Corporation, a corporation of Delaware
No Drawing. Filed Dec. 7, 1959, Ser. No. 857,497
14 Claims. (Cl. 167—65)

This invention relates to new and novel compositions of matter having marked anti-inflammatory and anti-capillary-fragility activity, comprising cis-cinnamic acids, and to a process for administering cis-cinnamic acids to prevent, alleviate or treat inflammatory processes.

Inflammatory processes in the body, commonly termed "inflammation," result from various stimuli which include traumatic, bacterial, chemical—both endogenous and exogenous, metabolic, and possibly other causes. While the actual mechanism of inflammation is not wholly defined or understood, it is known to stimulate what is medically termed antigen-anti-body action, involving the normal attempts of the body to establish a defense against the abnormal invading stimuli. Some of the manifestations of such antigen-anti-body activity are edema, hyperthermia, increase in fluid exchange at site of the inflammation, pain, increase in capillary fragility, change in normal blood constituents and others, all variously described in medical text books.

It is also known that certain enzyme activities of the body, both cellular and extra-cellular, are affected during inflammation, some enzyme activities decreasing, others increasing. Among those enzyme activities which appear to increase are certain proteolytic enzymes which stimulate proteolysis, resulting in an abnormal breakdown of protein substances chiefly at the site of the inflammation, with attendant increase in protein degradation products which are believed to be responsible for a number of the symptoms associated with inflammatory processes. Heretofore, these symptoms have been in part alleviated by certain chemicals as, for example, the salicylates, such as sodium salicylate, aspirin, salicylamide, the pyrazolones, such as antipyrine, phenyl butazone and amidopyrine, which tend to reduce the effects of inflammation by their enzyme inhibiting action. Other substances, such as certain derivatives of the hormonal steroids, among them being cortisone, hydrocortisone, prednisone, and prednisolone, have also been used, but apparently act by different mechanisms to reduce or prevent inflammation. Regardless of the mechanism of action, which at best is not well understood, these chemical substances are in general use by physicians to alleviate or treat such inflammations as respiratory infections, skin and muscle infections, traumatic as well as infectious involvement of the joints, and a number of other inflammatory conditions.

The blood capillary system, comprising thousands of fine capillaries, carrying blood from the main arteries and veins to the various organs, tissues, muscle and skin of the body, perform an important function in supplying blood to and removing waste products from such parts of the body. Thus normality of the capillary system is important to health. Weakness in the capillary system, often referred to as capillary fragility, may thus be contributory to or become a factor in the progress of an inflammatory process. Abnormal tendency to form hematomas (black and blue areas under the skin) from even slight blows on the arms, legs or body, and abnormal bleeding of the gums are often cited as examples of capillary fragility. Thus, abnormal hemorrhagic conditions may result from or even aggravate an inflammatory process.

In accordance with the instant invention compositions are provided comprising cis-cinnamic acids of the general formula:

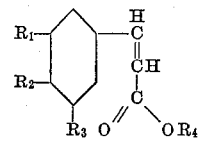

wherein $R_1$, $R_2$ and $R_3$ are selected from the group consisting of hydrogen, hydroxy, alkoxy having from one to two carbon atoms, i.e., methoxy and ethoxy, or halogen, such as chlorine, fluorine, bromine or iodine, and $R_4$ is selected from the group consisting of hydrogen, alkyl having from one to three carbon atoms, and aralkyl having from seven to nine carbon atoms, such as, for example, methyl, ethyl, isopropyl, propyl, methylphenyl, ethylphenyl, phenethyl, propylphenyl, phenisopropyl, phenpropyl, mesityl, methylbenzyl, xylyl, tolyl and dimethylbenzyl.

In addition to the cis-cinnamic acid compound, the compositions of the invention include a carrier which can be water, an organic solvent, or other diluent, a cream or emulsion base of conventional formulation or a solid carrier such as is used in the formulation of tablets. The compositions can be formulated so as to be administerable orally, parenterally, or topically. By such methods these compositions have marked anti-inflammatory and anti-capillary-fragility activity. The toxicity of these compounds is quite low, and the active ingredient can be administered in dosages adequate to obtain a therapeutic effect without adverse side effects. The concentration of the cis-cinnamic acid compound in these compositions is not in any way critical, but can be adjusted to meet the need. In general, the concentration for oral and parenteral administration will lie within the range from about 1 to about 100 mg. per unit dosage, i.e., per cc. of solution or per tablet or capsule, and for topical administration within the range from about 0.025 to 1% by weight of the composition, but larger amounts, up to about 10%, can be used if desired. Ordinarily, it is preferable to administer a composition having a low concentration of the active ingredient several times daily, as compared to a single daily dose having a relatively high concentration of the active ingredient, to achieve the total daily dosage required.

The preferred compound is cis-p-coumaric acid. Other cis-cinnamic acids will be apparent from the general formula above. Of these, cis-caffeic, cis-ferulic and cis-isoferulic acids would usually be employed.

In the process of the invention, the cis-cinnamic acid compound or mixture thereof in an appropriate amount to obtain a therapeutic effect is administrated to the patient orally, parenterally or topically or by any other appropriate method, there results an anti-inflammatory response and also an improvement in capillary fragility where this condition exists.

The examples illustrate various types of compositions coming within the invention and a variety of administration techniques.

*Example 1*

A composition of matter for oral adminstration, comprising cis-p-coumaric acid as the active anti-inflammatory ingredient in combination with a suitable carrier, was prepared by thoroughly mixing together 1000 grams of cis-p-coumaric acid and 3500 grams of beta-lactose (milk sugar), passing the blended mixture through a No. 40 screen and filling the mix into gelatin capsules, 450 mg."

per capsule, each capsule to contain 100 mg. of cis-p-coumaric acid.

Though the dose may be varied, depending on the age and weight of the individual, and degree of inflammation to be treated, in general, 100 to 800 mg. of the active ingredient per day in divided doses has given satisfactory response; and a composition can be in tablet or solution as indicated by the following examples.

*Example 2*

A composition of matter for oral administration, in tablet form, comprising cis-p-coumaric acid as the active anti-inflammatory ingredient in combination with a suitable carrier, was prepared by compounding the following ingredients into a tablet mix:

|  | Grams |
|---|---|
| Cis-p-coumaric acid | 308 |
| Sugar | 308 |
| Lactose | 177 |
| Starch | 98 |
| Dextrin | 50 |
| Talcum | 10 |
| Stearic acid | 10 |

Starch paste, q.s. to make 1000 grams.

The above mix was compressed into tablets, weighing approximately 325 mg., each tablet containing 100 mg. of cis-p-coumaric acid.

Cis-cinnamic acid was substituted for the cis-p-coumaric acid. Satisfactory tablets were obtained. Similarly, cis-caffeic, cis-ferulic and cis-isoferulic acids can be used.

Compositions of matter similar to those described under Examples 1 and 2 may be made by including other substances having therapeutic properties which enhance the total therapeutic value of the cis-cinnamic acid compound by their additive or by a synergistic effect; the effect, if synergistic, will enhance the therapeutic value of the cis-cinnamic acid compound without increase in dosage. Thus, known therapeutic substances, such as aspirin or equivalent salicylate compound, may be added for their analgesic and anti-rheumatic effect, Butazolidin or antipyrine or related compounds for their anti-pyretic and anti-phlogistic effects, hydrocortisone or prednisolone or one of its equivalent corticosteroids for their anti-rheumatic, anti-inflammatory and anti-phlogistic effects. The combination of a cis-cinnamic acid compound with one or more of the above additive substances also serves the purpose of an additive effect.

If desired, other substances, such as ascorbic acid, vitamin K, thiamine, etc., may be added to the composition of matter in adequate dosage to exert their individual activity for the therapeutic uses they are known to have.

*Example 3*

Typical examples of compositions such as referred to above were prepared by compounding cis-p-coumaric acid with a conventional aspirin tablet composition in the proportions of 25 to 100 mg. of cis-p-coumaric acid per 5 grains of aspirin, and tabletting the same.

*Example 4*

Another example of such a composition was prepared by compounding cis-p-coumaric acid and prednisolone in a tabletting formula comprising lactose, sucrose, gum acacia, corn starch, magnesium stearate and talc as excipients in a 2-grain tablet; the cis-p-coumaric acid and prednisolone being in the proportions of 25 mg. of cis-p-coumaric acid to 2.5 mg. prednisolone.

In the above examples the excipients may be varied in kind and amount, as long as they are adequate to cooperate with the active ingredients for tabletting purposes, and the dosage of the active ingredients of the tablet may also be varied but in reverse ratio. Thus, instead of the 10 to 1 ratio of cis-p-coumaric acid to prednisolone, a decrease of the steroid dose to 1 mg., if desired, would call for an increase of cis-p-coumaric acid to 50 mg., or a ratio of 50 to 1.

*Example 5*

A composition of matter for parenteral administration comprising cis-p-coumaric acid as the active anti-inflammatory ingredient in combination with a liquid carrier and having the following formula was prepared:

|  | Grams |
|---|---|
| Cis-p-coumaric acid | 25 |
| Sodium hydroxide | 5.74 |
| Benzyl alcohol | 5 |

Water, pyrogen-free, q.s. to 500 ml.

In making this solution the cis-p-coumaric acid was dissolved in 400 ml. of pyrogen-free water containing the sodium hydroxide, the benzyl alcohol added, and the solution was made up q.s. to 500 ml.; after which the solution was filtered aseptically and filled aseptically in ampules containing 1 ml., under a nitrogen atmosphere. The resulting solution supplied a dosage unit of 50 mg. of cis-p-coumaric acid. Here, again, the example is illustrative, since the composition of the active ingredient may be varied as desired to obtain other dosage forms in which case the sodium hydroxide is to be included in stoichiometric quantities.

The cis-cinnamic acid compounds of the invention can, if desired, be employed in conjunction with other substances. The water-soluble citrus bioflavonoid complex, sold under the trade name "C.V.P." by the U.S. Vitamin & Pharmaceutical Corporation, prepared from citrus peel molasses using isopropyl alcohol, as shown in U.S. Patent No. 2,559,685, can, for example, be employed as an excipient. This bioflavonoid complex has certain therapeutic properties, as is known to those skilled in the art, and to these properties is added the anti-inflammatory and anti-capillary-fragility activity of the cis-cinnamic acid compound of the invention.

*Example 6*

A cream for topical administration comprising cis-p-coumaric acid as the active anti-inflammatory ingredient in combination with a cream base was prepared according to the following formulation:

|  | Grams |
|---|---|
| Cetyl alcohol | 150 |
| Spermaceti | 50 |
| Methyl paraben | 1.50 |
| Propyl paraben | 0.90 |
| Glycerine | 50 |
| Water | 737 |
| Cis-p-coumaric acid | 0.50 |
| Duponol-C (sodium lauryl sulfonate) | 10 |
| Sodium hydroxide | 0.12 |

This composition was prepared by thoroughly mixing together cetyl alcohol, spermaceti, methyl paraben and propyl paraben in the amounts set forth and heating to 70° C. with stirring until a uniform mix was obtained. Sodium hydroxide was dissolved in 160 ml. of water and 0.5 g. cis-p-coumaric acid added with stirring until solution was complete. To this solution was added Duponol-C and 577 g. of water, after which the mixture was heated to 70° C. with stirring. The mixture was then added to the solution first prepared at 70° C. with sitrring, and stirring continued until the cream cooled to room temperature. The resulting cream contained 0.05% cis-p-coumaric acid and was useful for therapeutic administration to control inflammation in a dosage of from 0.25 mg. to 10 mg. per day of the active ingredient cis-p-coumaric acid.

*Example 7*

Example 6 was repeated included 20 g. of d-pantothenylol in the cis-p-coumaric acid solution. The resulting product contained 2% d-pantothenyl alcohol and 0.05% cis-p-coumaric acid.

This composition also is useful in the treatment of inflammation by topical application, the active cis-p-coumaric acid ingredient being administered in dosages of from 0.25 mg. to 10 mg. per day.

*Example 8*

A cream for topical application was prepared having the following formulation:

| | Grams |
|---|---|
| Methyl paraben | 1.50 |
| Propyl paraben | 0.90 |
| Stearyl alcohol | 170 |
| Protopet (petrolatum) | 170 |
| Propylene glycol | 120 |
| Myrj-52 (Polyoxyl 40 stearate) | 50 |
| Neomycin sulfate | 5 |
| d-Pantothenylol | 20 |
| Cis-p-coumaric acid | 0.50 |
| Sodium hydroxide | 0.12 |
| Water | 452 |

The methyl paraben, propyl paraben, stearyl alcohol and protopet were mixed together and heated with stirring to 70° C. to form a uniform mix. 427 ml. of water, the sodium hydroxide, propylene glycol, cis-p-coumaric acid, Myrj-52 and d-pantothenylol were mixed together and heated with stirring to 70° C. The two solutions were then mixed at 70° C. and allowed to cool to 60° C., after which the neomycin sulfate was added, in solution in the remainder of the water. The stirring was continued until the mixture reached room temperature.

Although the dose may be varied, depending upon the age and weight of the individual, and the degree of inflammation to be treated, in general 0.25 mg. to 25 mg. of the active ingredient per day in divided doses has given satisfactory response.

Sodium hypophosphite (0.2%) and sodium bisulfite (0.2%) may be added to this composition to prevent discoloration of the neomycin.

*Example 9*

A cream for topical application was preparing having the following formulation:

| | Grams |
|---|---|
| Cetyl alcohol | 150 |
| Spermaceti | 50 |
| Methyl paraben | 1.50 |
| Propyl paraben | 0.90 |
| Arlacel 161 (glyceryl monostearate) | 7.25 |
| Glycerine | 50 |
| d-Pantothenylol | 20 |
| Water | 671.98 |
| Myrj-52 (Polyoxyl 40 stearate) | 42.75 |
| Neomycin sulfate | 5 |
| Cis-p-coumaric acid | 0.50 |
| Sodium hydroxide | 0.12 |

The cetyl alcohol, spermaceti, methyl paraben, propyl paraben, and Arlacel 161 were weighed into a suitable vessel, and heated to 70° C., with stirring, until a uniform mix was obtained. 621 ml. of water, the sodium hydroxide, cis-p-coumaric acid, glycerine, d-pantothenylol and Myrj-52 were mixed together, and heated with stirring to 70° C. The two solutions were then mixed at 70° C. with stirring and allowed to cool to 60° C. The neomycin sulfate was then dissolved in the remainder of the water and added to the solution at 60° C., while stirring was continued until the solution reached room temperature.

Sodium hypophosphite (0.2%) and sodium bisulfite (0.2%) may be added to prevent discoloration of the neomycin.

In general, from 0.25 to 10 mg. of the active ingredient per day has given a satisfactory response by topical application, although the dose may be varied depending upon the age and weight of the individual and of the degree of inflammation to be treated.

The creams of Examples 8 and 9 may be made without addition of the d-pantothenylol. In this event, the amount of water is increased by the amount equal to the weight of d-pantothenylol removed.

Creams containing from 0.25% to 2.5% cis-p-coumaric acid may be prepared by this procedure by adjusting the weight of sodium hydroxide in stoichiometric proportion to the weight of cis-p-coumaric acid, and either adding or removing the equivalent amount of water from the formulation.

*Example 10*

An ophthalmic solution for application to the eyeball was prepared according to the following formulation:

| | Grams |
|---|---|
| d-Pantothenylol | 10 |
| Neomycin sulfate | 5 |
| Cis-p-coumaric acid | 0.2 |
| Sodium borate | 10 |
| Boric acid | 10 |
| Sodium hypophosphite | 2 |
| Sodium bisulfite | 2 |
| Tween 80 (Sorbitan monolaurate) | 2 |
| Benzalkonium chloride | 0.2 |
| Distilled water | 958.6 |

The Tween 80, d-pantothenylol, sodium bisulfite, sodium hypophosphite, sodium borate, boric acid, cis-p-coumaric acid, neomycin and benzalkonium chloride were dissolved in water in the order named. The resulting solution was then filtered aseptically by the standard procedure for handling solutions for ophthalmic use.

This composition is useful in the treatment of inflamed eyeballs, the active ingredient being administered in daily dosages varying from 0.25 mg. to 10 mg., depending upon the degree of inflammation and the patient.

This formulation may be modified by eliminating either the d-pantothenylol or the neomycin sulfate or both, replacing them with an equal weight of water.

*Example 11*

A composition suitable for use as a nasal drop was prepared having the following formulation:

| | Grams |
|---|---|
| Phenylephrine hydrochloride | 2.50 |
| Cis-p-coumaric acid | |
| Sodium dihydrogen phosphate dihydrate | 1.53 |
| Sodium phosphate dibasic heptahydrate | 1.34 |
| Methyl paraben | 0.90 |
| Propyl paraben | 0.10 |
| Distilled water q.s. to 1000 ml. | |

The sodium dihydrogen phosphate dihydrate and sodium phosphate dibasic heptahydrate were dissolved in approximately 800 ml. of water. The phenylephrine hydrochloride, cis-p-coumaric acid, methyl paraben and propyl paraben were added and the solution stirred until they had dissolved. Distilled water was then added to a total volume of 1000 ml. This composition contained 0.05% cis-p-coumaric acid.

Administration several times daily of a dosage from 0.25 mg. to 10 mg. of the active ingredient gave good control of inflammations in the nasal passages.

Surprisingly, the anti-inflammatory activity and anti-capillary-fragility activity of the trans isomer is extremely small, so small that these compounds can be regarded as practically inactive in comparison. Accordingly, such isomers are expressly disclaimed, although these isomers can be present as impurities with the cis isomers, since they are not toxic, but merely inert.

The following clinical tests demonstrate the activity of the cis isomers. The clinical experiments were carried out with the cis-cinnamic acid compound in the form of a composition for oral administration by several clinicians practicing internal medicine in a number of hospitals in the United States and Canada. The cis compound was found to be effective in the control of renal bleeding and proteinuria in the glomerulo nephritis and nephrotic syndrome; in functional improvement in respiratory capacity, as measured by timed vital capacities intra-pulmonary gas-mixing and expiratory flow studies, in clinical asthmatic bronchitis with obstructive emphysema; by the ability of the cis compound to restore elevated urinary protein levels in diabetic nephropathy to normal levels. These clinical findings have been confirmed by several clinicians in different institutions in different cities. Clinical findings have also shown the cis isomer to be effective in controlling menorrhagia and metrorrhagia, condtions involving abnormal hemorrhagic phenomena. These findings have been confirmed by more than two clinicians.

Controlled experiments have shown the trans isomer to be totally ineffective in the same case under conditions in which the cis isomer was found to be effective.

Clinical results for the cis-p-coumaric acid in topical application have shown it to be effective in 76% of the cases of dermatological disorders treated. These conditions included atomic dermatitis, chronic eczema, contact dermatitis, pruritis, vulvae et ani, dermatitis herpetiformis, housewives' eczema with ulceration, and radio dermatitis. Out of 21 cases observed over a period of up to one year, previously treated with steroid-containing preparations, chiefly hydrocortisone and prednisolone, 13 cases on the experimental cream containing the cis isomer gave better results than on the steroid-containing preparations, and in 8 cases the results were equally as good. However, the cis isomer was free from the deleterious side effects noted in the treatment with the steroid-containing preparations. In the steroid-containing preparations, the steroid content ranged from ½ to 2%. In 6 of the cases, the experimental cream was tested against controls. Four of the controls were the base itself; in these, the experimental cream gave unmistakably superior results. In the other two controls, the base contained the trans isomer compound; the experimental cream again gave superior results, the trans isomer composition being therapeutically ineffective.

We claim:

1. A therapeutic composition suitable for the treatment of inflammations and capillary weakness, consisting essentially of a cis-cinnamic acid compound of the general formula:

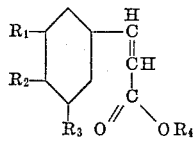

wherein $R_1$, $R_2$ and $R_3$ are selected from the group consisting of hydrogen, hydroxy, and alkoxy having from one to two carbon atoms, and $R_4$ is selected from the group consisting of hydrogen, alkyl having from one to three carbon atoms, and aralkyl having from seven to nine carbon atoms, and an emulsion cream carrier therefor acceptable for therapeutic administration.

2. A capsulated composition in accordance with claim 1.

3. A composition in accordance with claim 1 in which the cinnamic acid compound is cis-p-coumaric acid.

4. A composition in accordance with claim 1 in which the cinnamic acid compound is cis-caffeic acid.

5. A composition in accordance with claim 1 in which the cinnamic acid compound is cis-ferulic acid.

6. A composition in accordance with claim 1 in which the cinnamic acid compound is cis-isoferulic acid.

7. A process for the treatment of inflammations and capillary weakness, which comprises administering a therapeutic amount of a cis-cinnamic acid compound of the general formula:

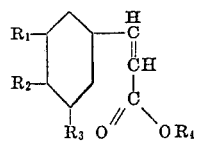

wherein $R_1$, $R_2$ and $R_3$ are selected from the group consisting of hydrogen, hydroxy, and alkoxy having from one to two carbon atoms, and $R_4$ is selected from the group consisting of hydrogen, alkyl having from one to three carbon atoms, and aralkyl having from seven to nine carbon atoms.

8. A process in accordance with claim 7, in which the compound is administered orally.

9. A process in accordance with claim 7, in which the compound is administered parenterally.

10. A process in accordance with claim 7, in which the compound is administered topically.

11. A process in accordance with claim 7, in which the compound is administered in the form of an aqueous solution.

12. A process in accordance with claim 7, in which the compound is administered in the form of a tablet.

13. A process in accordance with claim 7, in which the compound is administered in the form of a capsule.

14. A process in accordance with claim 7, in which the compound is administered in the form of an emulsion cream.

References Cited in the file of this patent

UNITED STATES PATENTS

| | | |
|---|---|---|
| 1,099,710 | Mannich et al. | June 9, 1914 |
| 2,038,114 | Joseph | Apr. 21, 1936 |
| 2,213,717 | Poizat et al. | Sept. 3, 1940 |
| 2,279,468 | Lahousse et al. | Apr. 14, 1942 |
| 2,425,291 | Wilson | Aug. 5, 1947 |
| 2,435,005 | Huppke et al. | Jan. 27, 1948 |
| 2,788,308 | Ochs et al. | Apr. 9, 1957 |
| 2,791,534 | Schaaf et al. | May 7, 1957 |
| 2,952,674 | Merritt et al. | Sept. 13, 1960 |
| 2,974,089 | Alexander et al. | Mar. 7, 1961 |

OTHER REFERENCES

Williams: "J. Am. Chem. Soc.," vol. 64, pp. 1395-1404 (1942).

Takeda: "Nogaku Kenkyu," vol. 41, pp. 82-6 (1953). (In Japanese.) See also Chem. Abstract. vol. 49, 11793a (1955).

Moewus: "Congr. Intern. Botan. (Paris)," vol. 8, Sec. 17 (1954), pages 46-47.

Nitsch et al.: "Am. J. Botany," vol. 43, pages 839-51 (1956).

Krantz and Carr: "Pharmacologic Principles of Medical Practice," William and Wilkins Co. Baltimore, Md. (1949), pages 1-6.